Sept. 26, 1939.   A. CHAUVIN   2,174,201
FILING SYSTEM
Filed July 15, 1936   2 Sheets-Sheet 1
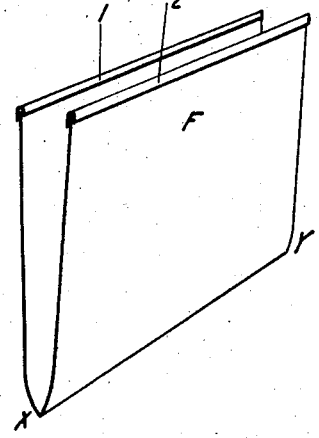
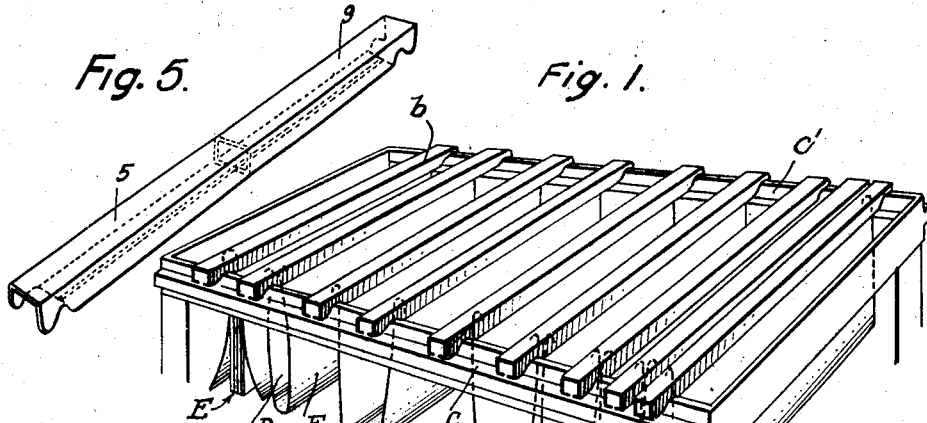
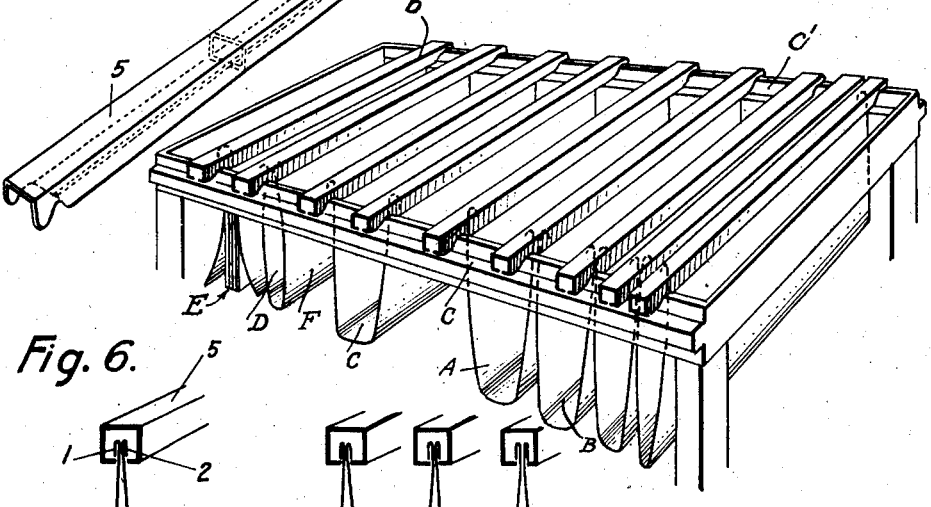
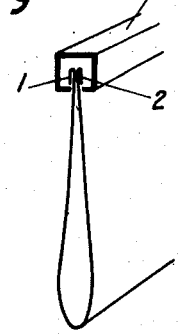
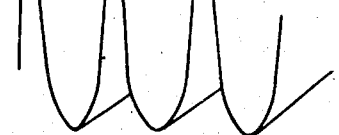
Inventor:
André Chauvin
Attorney Sept. 26, 1939.   A. CHAUVIN   2,174,201
FILING SYSTEM
Filed July 15, 1936   2 Sheets-Sheet 2
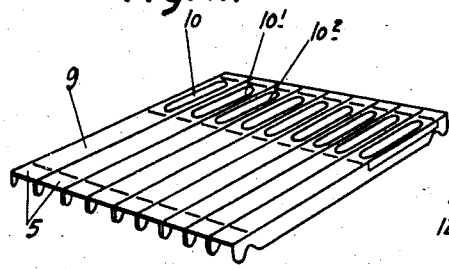
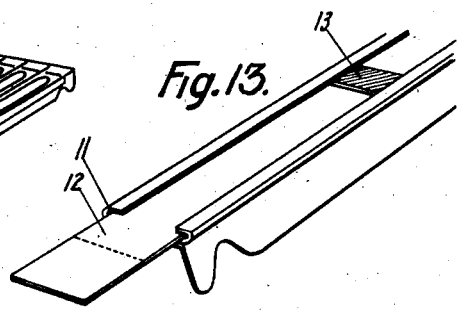
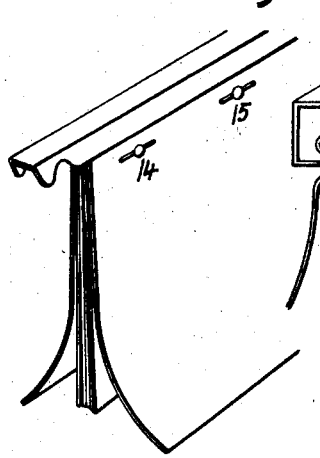
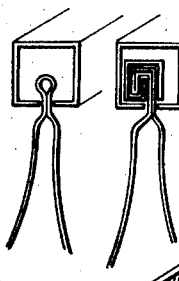
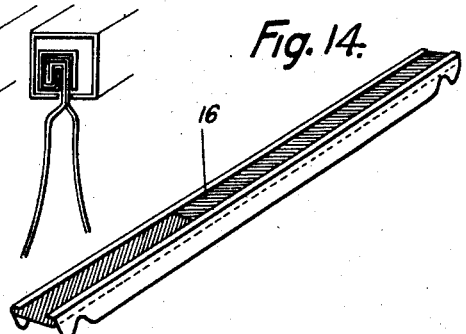
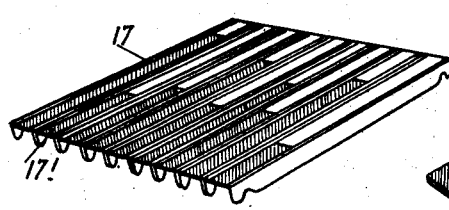
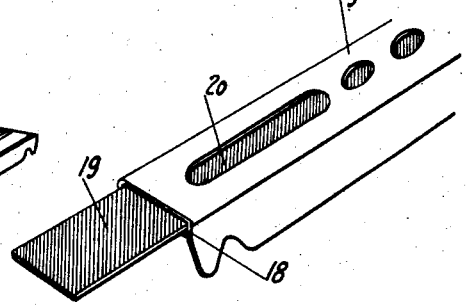
Inventor:
André Chauvin
Fred F. Barlow
Attorney Patented Sept. 26, 1939

2,174,201

UNITED STATES PATENT OFFICE 2,174,201

FILING SYSTEM

André Chauvin, Paris, France

Application July 15, 1936, Serial No. 90,670
In France July 26, 1935

5 Claims. (Cl. 129—16)

This invention relates to filing systems of the type comprising vertically arranged foldable files which include between their thicknesses the papers to be stored, the said files being carried by suspension bars adapted to engage with horizontal runners.

According to the invention the suspension bars are so formed that they can receive a single individual thickened edge of a file, or the two associated thickened edges of a single file, or the thickened backing of a binder. In preferred arrangements said suspension bars are shaped with U-shaped notches at or towards their ends for engaging with the horizontal runners.

Additionally, the backings of the said suspension bars may be utilised to receive markings, windows or other indications of varied nature.

In general, the invention is illustrated in the accompanying drawings, in which—

Fig. 1 is a perspective view showing its varied applications.

Fig. 2 is a perspective view of the normal type of folder or file for use in accordance with the invention.

Figs. 3 and 4 show alternative methods of thickening or strengthening the upper edges of said files.

Fig. 5 is a perspective view of a preferred form of suspension bar.

Fig. 6 shows a perspective view of one method of engaging the two thickened edges of one file in the same suspension bar.

Fig. 7 shows a similar view to Fig. 6 but illustrating the engagement of the edges of the same file with successive bars and also the engagement of successive bars with adjacent files.

Fig. 8 is a diagrammatic perspective view showing the engagement of a bar with the back of a binding file.

Figs. 9 and 10 show details of the engagement of the backs of binding files with suspension bars.

Fig. 11 shows a series of suspension bars side by side with indicating windows therefor.

Fig. 12 shows a somewhat similar view of a modification hereafter referred to.

Figs. 13, 14 and 15 also illustrate details of indexing in perspective views associated with the suspension bars.

In the drawings and with particular reference to Fig. 2, this shows a vertical folder F having thickened edges 1 and 2 folded about the line X—Y. Figs. 3 and 4 show methods of formation of the thickened edges, that in Fig. 3 including a rod 3, a turned-over portion 4 of the folder being stapled to its adjacent thickness. Fig. 4 shows a bent reinforcement to a turned-over or U-shaped edge to the folder.

Referring now particularly to Fig. 5, this shows a suspension bar formed from sheet metal 5 bent approximately into a square or rectangular section leaving a gap on its underside and terminating at the two ends in somewhat U-shaped notches. This is illustrated in Fig. 1 by the reference letter b.

Figs. 6 and 7 show how folders such as shown in Fig. 1 can be engaged with the bars 5; that is to say in Fig. 6 both edges 1 and 2 of a folder can be engaged with one bar whereas in Fig. 7 the edges of the folder can be engaged with adjacent bars. Moreover, it should be pointed out in Fig. 7 successive bars carry successive folders, although a pair of bars might be provided for one folder.

Now referring particularly to Fig. 1. In this figure the reference letters A and B show how successive folders are engaged in successive bars b which work upon the guide rails c and c' to form a series of folders. The reference letter C is intended to illustrate how the thickened edges of one folder can be engaged by two bars, while the reference letter D similarly shows how the two thickened edges of one folder can be engaged with one bar. Moreover, the reference letter E shows how the thickened backing of a binding, such for example as illustrated in Figs. 8, 9 and 10, can be engaged by one bar. It should be observed in Fig. 8 that 14 and 15 are clamping devices for the folder proper, to hold the papers in position.

When the file is out of use the suspension bars may be brought side by side as shown in Fig. 11. It should be remarked, however, that this figure does not show the hanging files but it illustrates how the upper portions 9 thereof may be used to advantage for the locating or indexing of their contents. This may be by printing or other indications or by the use of indicating labels 10, 10¹, 10².

Celluloid protectors having the same form as the bar may also be mounted on the latter and will protect the labels placed between the said protector and the bar itself.

The face carrying the labels may further comprise, as shown in Fig. 13, a narrow guideway 11 to receive printed labels 13 and also, if desired, a Celluloid strip, coloured or otherwise, such as 12. Additionally, such guides can be used for carrying indicating riders, graph strips or otherwise to form assemblies such for example as illustrated by Figs. 12 and 14. In Fig. 14, the numeral 16 indicates a two-colored graph strip. The system disclosed makes it possible to remove any bar 17 or 17' (Fig. 12), after which the remaining bars may be moved to close the gap.

Fig. 15 shows another form where the suspension bars have apertures such as 20 and guideways 18 to receive strips 19, the colours or indications of which come opposite suitable openings 20 to effect the required indications.

I claim:

1. A filing system which comprises, in combination, two spaced parallel horizontal rails, a plurality of suspension bars adapted to bear each at both ends on said rails respectively, each of said bars being channel-shaped so as to form a narrow slot communicating with the hollow inside of the bar and running over the whole length of the under side thereof, and folders having thickened edges adapted to be engaged in the hollow insides of said bars so as to bear against the edges of said slots, whereby said folders can be interchangeably suspended to said bars, in such manner as to form filing pockets.

2. A filing system which comprises, in combination, two spaced parallel horizontal rails, a plurality of suspension bars adapted to bear each at both ends on said rails respectively, each of said bars being channel-shaped so as to form a narrow slot communicating with the hollow inside of the bar and running over the whole length of the under side thereof, each of said bars being provided near the ends thereof, with notches transverse to said slot provided in the under side of the bar and adapted to fit on said rails, and folders having thickened edges adapted to be engaged in the hollow insides of said bars so as to bear against the edges of said slots, whereby said folders can be interchangeably suspended to said bars, in such manner as to form filing pockets.

3. A filing system which comprises, in combination, two spaced parallel horizontal rails, a plurality of suspension bars adapted to bear at both ends on said rails respectively, each of said bars being of rectangular section and channel-shaped, so as to form along its under side, which corresponds to the longer side of said rectangular section, a narrow slot communicating with the hollow inside of said bar and running over the whole length thereof, each of said bars being provided, near the ends thereof, with notches transverse to said slot provided in the under side of the bar and adapted to fit on said rails, respectively, and folders having thickened edges adapted to be engaged in the hollow insides of said bars so as to bear against the edges of said slots, whereby said folders can be interchangeably suspended to said bars, in such manner as to form filing pockets.

4. A filing device comprising supporting rails, a plurality of hollow suspension bars supported and slidable on the said rails, the said hollow bars being provided with a narrow slot extending longitudinally throughout the length of each bar, and folders supported from their edges vertically by the said bars, the said edges of the folders being thickened and telescoped with the said hollow bars and the said bars being adapted to receive interchangeably the thickened edges of the same folder and of adjacent folders.

5. In a filing system, suspension bars each having a narrow slot extending longitudinally in the bottom thereof, and folders having thickened edges positioned to bear against the edges of the said slots in such manner as to form filing pockets, the different sides of adjacent pockets of which are interchangeable in the said slots.

ANDRÉ CHAUVIN.